(12) United States Patent
Aida et al.

(10) Patent No.: US 8,588,473 B2
(45) Date of Patent: Nov. 19, 2013

(54) IMAGE PROCESSING APPARATUS, CONTROL METHOD THEREOF, AND PROGRAM

(75) Inventors: Toru Aida, Machida (JP); Eisaku Tatsumi, Kawasaki (JP); Kazuya Kitada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 120 days.

(21) Appl. No.: 12/964,437

(22) Filed: Dec. 9, 2010

(65) Prior Publication Data

US 2011/0142290 A1 Jun. 16, 2011

(30) Foreign Application Priority Data

Dec. 11, 2009 (JP) ................................. 2009-282295

(51) Int. Cl.
*G06K 9/00* (2006.01)
(52) U.S. Cl.
USPC ........................................................ 382/107
(58) Field of Classification Search
None
See application file for complete search history.

(56) References Cited

U.S. PATENT DOCUMENTS 7,542,619 B2 6/2009 Toyooka
7,844,128 B2 * 11/2010 Toyooka et al. ............. 382/276
2009/0273611 A1 * 11/2009 Itokawa et al. .............. 345/619
2010/0253853 A1 * 10/2010 Sakashita ..................... 348/687
2010/0260385 A1 * 10/2010 Chau ............................ 382/107

FOREIGN PATENT DOCUMENTS

| CN | 1798247 A | 7/2006 |
|---|---|---|
| JP | 2006-184896 A | 7/2006 |
| JP | 2008-111910 A | 5/2008 |
| JP | 2009-053221 A | 3/2009 |
| JP | 2009-271135 A | 11/2009 |
| WO | 2009/070892 A1 | 6/2009 |

* cited by examiner

*Primary Examiner* — Stephen R Koziol
*Assistant Examiner* — Delomia Gilliard
(74) *Attorney, Agent, or Firm* — Canon USA, Inc., IP Division

(57) ABSTRACT

Provided is a method for controlling an image processing apparatus for generating and outputting frames different from each other in frequency component from an input frame include, detecting motion of the input frame by comparing the input frame with a frame before or after the input frame in terms of time, storing the input frame in a frame memory, and reading the input frame by a plurality of times to convert a frame rate of the input frame, generating the frames different from each other in frequency component from the frame whose frame rate has been converted, outputting the generated frames if the detected input frame is determined to be a moving image, and outputting the frame whose frame rate has been converted if the input frame is determined to be a still image.

11 Claims, 11 Drawing Sheets

US 8,588,473 B2

IMAGE PROCESSING APPARATUS, CONTROL METHOD THEREOF, AND PROGRAM

BACKGROUND OF THE INVENTION

1. Field of the Invention

The present invention relates to moving image processing for converting a frame rate, and more particularly to conversion into a higher frame rate such as conversion of an image of 60 hertz (Hz) into an image of 120 Hz.

2. Description of the Related Art

Conventionally, as a technique for suppressing motion blurs or flickers generated when a video is displayed by a display apparatus, there has been known a video display method for generating sub-frames different from each other in frequency component from image data, and alternately displaying the sub-frames at a multiplied speed (as discussed in Japanese Patent Application Laid-Open No. 2006-184896). The video display method generates, from input image data, high-frequency emphasized image data (second sub-frame) where a high-frequency component is emphasized, and low-frequency image data (first sub-frame) including a low-frequency component where a high-frequency component is suppressed, and alternately displays these image data pieces at the multiplied speed. This technique can suppress flickers and reduce motion blurs.

The above described video display method can suppress flickers and reduce motion blurs for moving image data. However, for still image data, a contour portion of the input image data is perceived as a flicker.

SUMMARY OF THE INVENTION

An embodiment is directed to a moving image processing apparatus capable of suppressing flickers and reducing motion blurs for both moving image data and still image data, and a control method thereof.

According to an embodiment, an image processing apparatus includes a detection unit, a conversion unit, a generation unit, and an output unit. The mage processing apparatus is for generating frames different from each other in frequency component from an input frame and outputting the generated frames. The detection unit detects motion of the input frame by comparing the input frame with a frame before or after the input frame in terms of time. The conversion unit stores the input frame in a frame memory and read the input frame a plurality of times to convert a frame rate of the input frame. The generation unit generates the frames different from each other in frequency component from the frame whose frame rate has been converted by the conversion unit. The output unit outputs the frames generated by the generation unit if the detection unit determines that the input frame is a moving image, and outputs the frame whose frame rate has been converted by the conversion unit if the detection unit determines that the input frame is a still image.

According to the embodiments, flickers can be suppressed and motion blurs can be reduced for both moving image data and still image data.

Further features and aspects will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects and, together with the description, serve to explain the principles of the embodiments.

DESCRIPTION OF THE EMBODIMENTS

Various exemplary embodiments, features, and aspects will be described in detail below with reference to the drawings.

Figure 1:
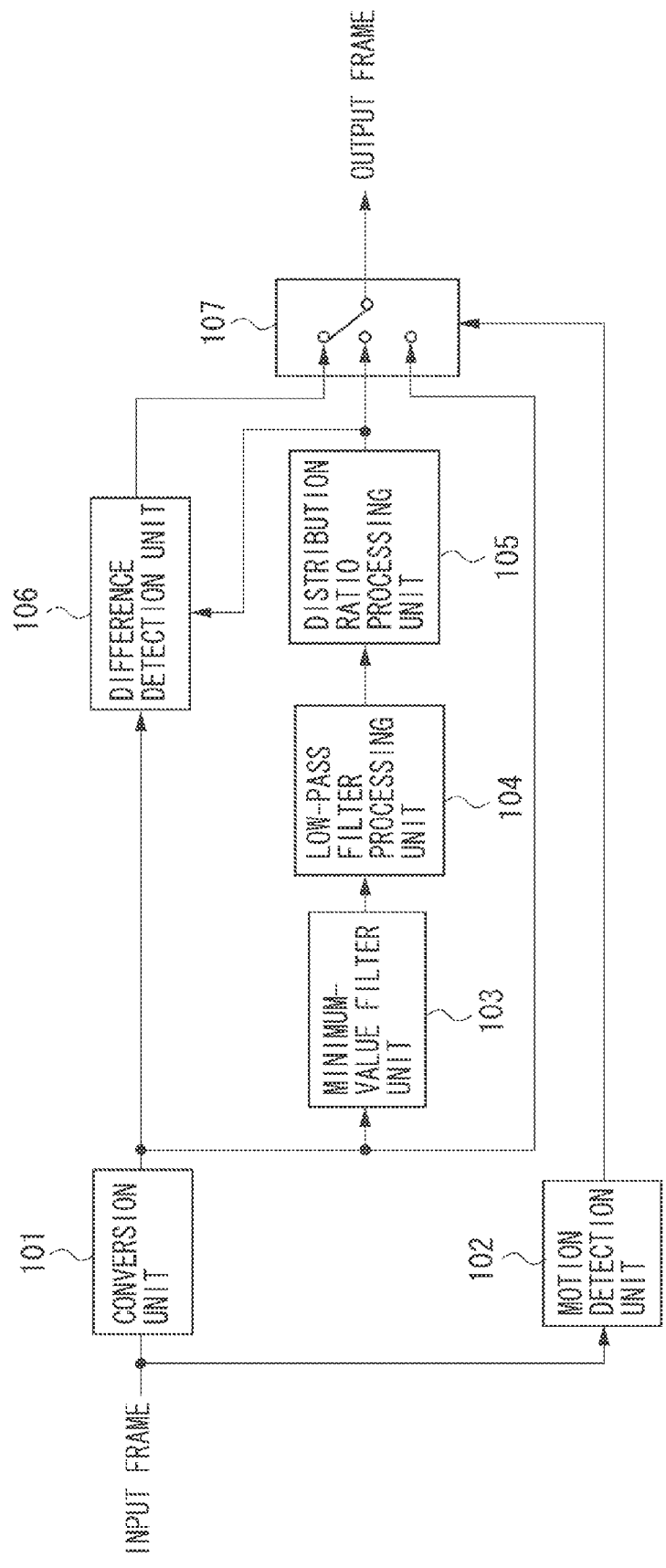
FIG. 1 illustrates an example of an image processing apparatus according to a first exemplary embodiment.

FIG. 1 illustrates an example of an image processing apparatus for performing multiplied-speed driving in a display apparatus corresponding to the first exemplary embodiment, more particularly an impulse display apparatus such as a field-emission type display apparatus.

In FIG. 1, an input frame that is image data is input to a conversion unit 101, stored in a frame memory (not illustrated) in the conversion unit 101, and read by a plurality of times. In the present exemplary embodiment, the input frame is subjected to conversion to a multiplied speed for twice-writing. A frame rate of the input frame is accordingly converted. The input frame is divided into two to generate a first sub-frame where a high-frequency component of an image is suppressed and a second sub-frame where a high-frequency component is emphasized. A method for generating the first sub-frame where the high-frequency component is suppressed is described first.

A minimum-value filter unit 103 performs minimum-value filtering to select a pixel minimum value in a block as preprocessing of low-pass filtering at a low-pass filter processing unit 104. The minimum-value filtering is performed to reduce bleeding of a moving image. Hereinafter, the bleeding of the moving image is described.

Figure 9:
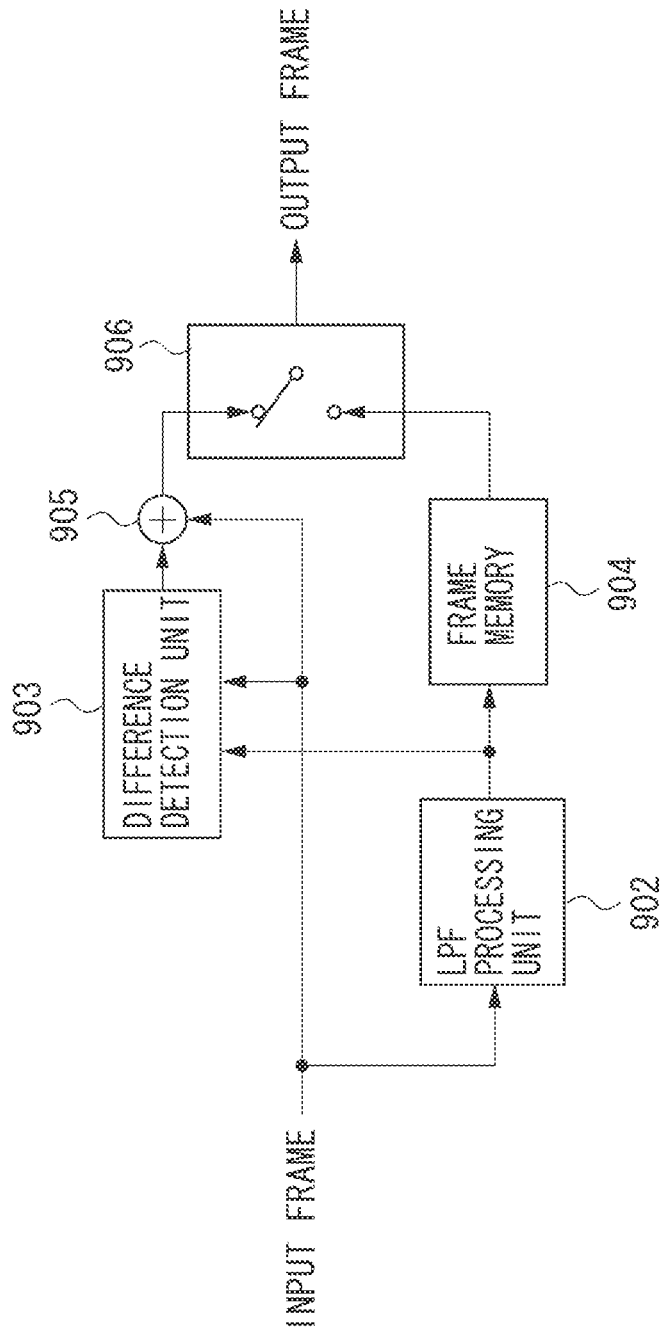
FIG. 9 illustrates a conventional circuit configuration.
Figure 10:
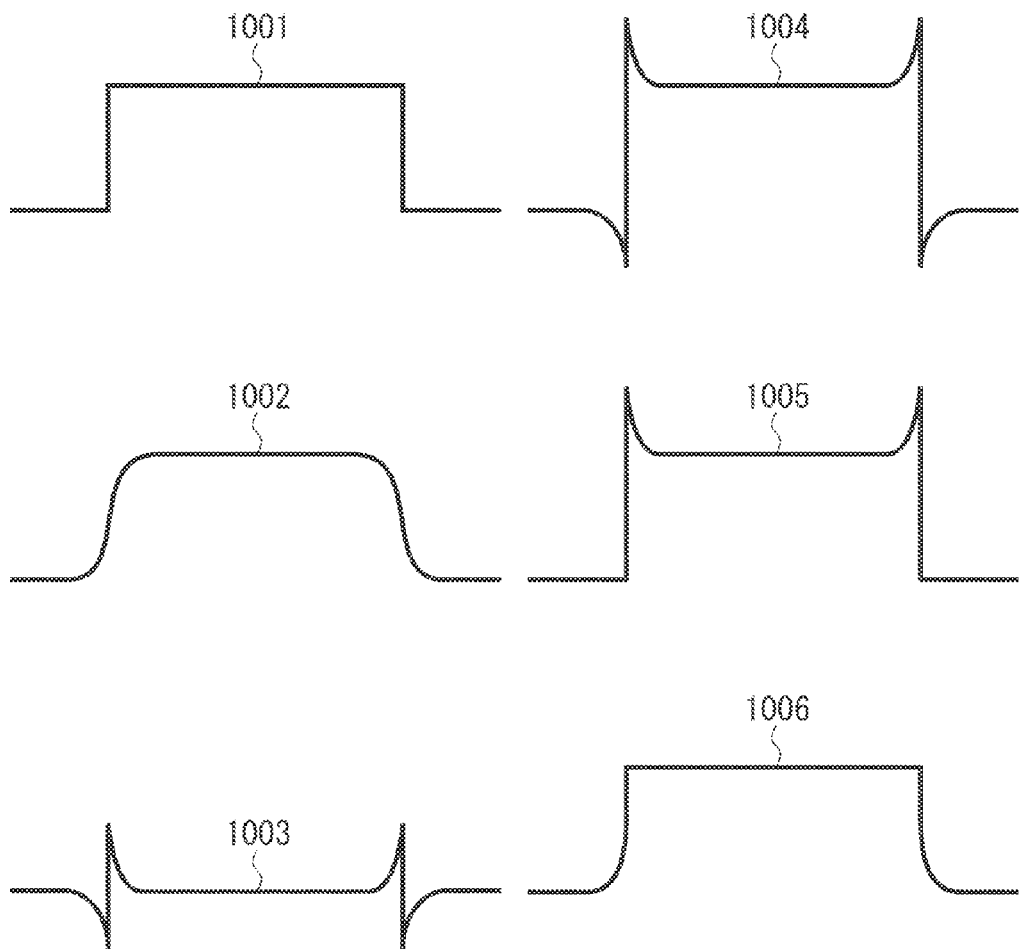
FIG. 10 illustrates a processing waveform according to a conventional method.

FIG. 10 illustrates an example of a waveform of a frame image output from a multiplied-speed driving circuit (conventional art) illustrated in FIG. 9. A waveform 1001 is an example of a waveform of an input frame. A waveform 1002 is an output waveform acquired by performing low-pass filtering for the waveform 1001 at a low-pass filter (LPF) processing unit 902 illustrated in FIG. 9. A waveform 1003 is an output waveform acquired by detecting a difference at a difference detection unit 903 illustrated in FIG. 9. The waveform 1003 takes a positive or negative value as it contains a high-frequency component. A waveform 1004 is acquired by adding the waveform 1003 containing the high-frequency component to the original waveform 1001 of the input frame.

Theoretically, an apparent waveform is similar to the waveform 1001 by alternatively displaying the waveform 1002 and the waveform 1004 at a frequency of 120 Hz. However, when a value of a low-luminance level portion of the waveform 1001 is zero or near zero, the waveform 1004 has a negative value.

An image of a negative value cannot be displayed. In reality, therefore, the negative value is displayed as zero as in the case of a waveform 1005. The waveform 1002 and the waveform 1005 are then displayed alternately, and thus an apparent combined image is similar to a waveform 1006. When there is a white character in a black background, the apparent combined waveform is perceived as an image having a blurred character contour or a bled image. In the case of such a waveform of an input image, an image after division processing may not be seen similar to the original image, but rather perceived as deterioration. The minimum-value filtering can reduce the bleeding of the moving image.

In the minimum-value filtering, for a processing target pixel of the input frame, a block of a predetermined filer size (e.g., 9*9) is set. One of peripheral pixels of the processing target pixel having a minimum pixel value in the block is selected to replace a pixel value of the processing target pixel. Processing of the minimum-value filter is not restricted to the selection of a minimum value in the filter size. For example, when a minimum value in the filter size is extremely small, noise may be generated. Thus, the minimum pixel value is not selected. Instead, a second smallest value can be selected.

Figure 2:
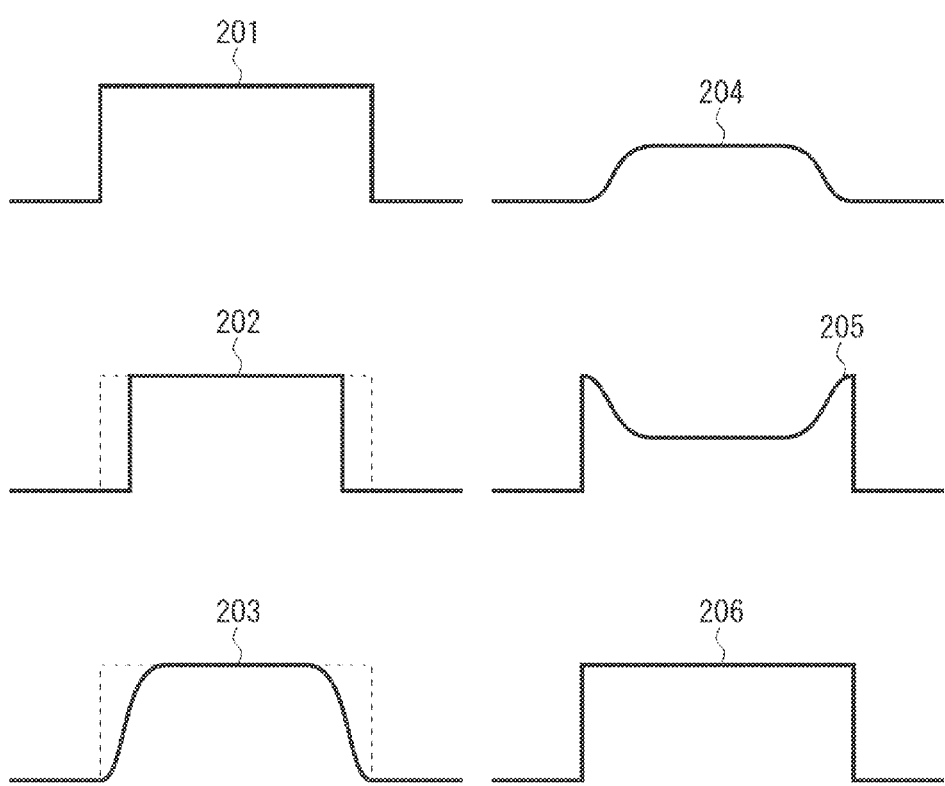
FIG. 2 illustrates a processing waveform according to the first exemplary embodiment.

In FIG. 2, a waveform 201 is an example of an input waveform. A waveform 202 is acquired as a result of performing minimum-value filtering for the input waveform 201 by the minimum-value filter unit 103. In the input frame, in a boundary where a pixel value of a high luminance and a pixel value of a low luminance are adjacent to each other, the pixel value of the low luminance is selected. Thus, an edge boundary is narrowed inside a high-luminance area as indicated by the waveform 202.

The low-pass filter processing unit 104 performs two-dimensional low-pass filtering for the input frame. For the low-pass filter, no particular function is defined. For example, Gaussian function or a moving average or weighted moving average filter can be used.

A distribution ratio processing unit 105 determines a ratio of emitting light from two sub-frames. To make flickers difficult to be perceived, a difference in brightness between the two sub-frames is advisably reduced. Thus, the present exemplary embodiment is described by taking an example of a distribution ratio of 50% each. A waveform 204 is acquired by multiplying a waveform 203 by 0.5. The waveform 204 is set as a first sub-frame where a high-luminance component is suppressed.

By performing the minimum-value filtering and the low-pass filtering for the input frame and applying the distribution ratio as described above, generation of the first sub-frame where the high-frequency component is suppressed is completed. The first sub-frame is output to a switching unit 107.

A method for generating a second sub-frame where a high-frequency component is emphasized is described. A difference detection unit 106 functions as a second sub-frame generation unit, subtracts the first sub-frame from the input frame converted to a multiplied speed for twice-writing, and outputs a difference as the second sub-frame where the high-frequency component is emphasized. The second sub-frame is output to the switching unit 107. The input frame converted to the multiplied speed for twice-writing is output to the switching unit 107.

Thus, the minimum-value filter unit 103, the low-pass filter processing unit 104, the distribution ratio processing unit 105, and the difference detection unit 106 generate frames different from each other in frequency component. Each unit can function as one generation unit.

Figure 3:
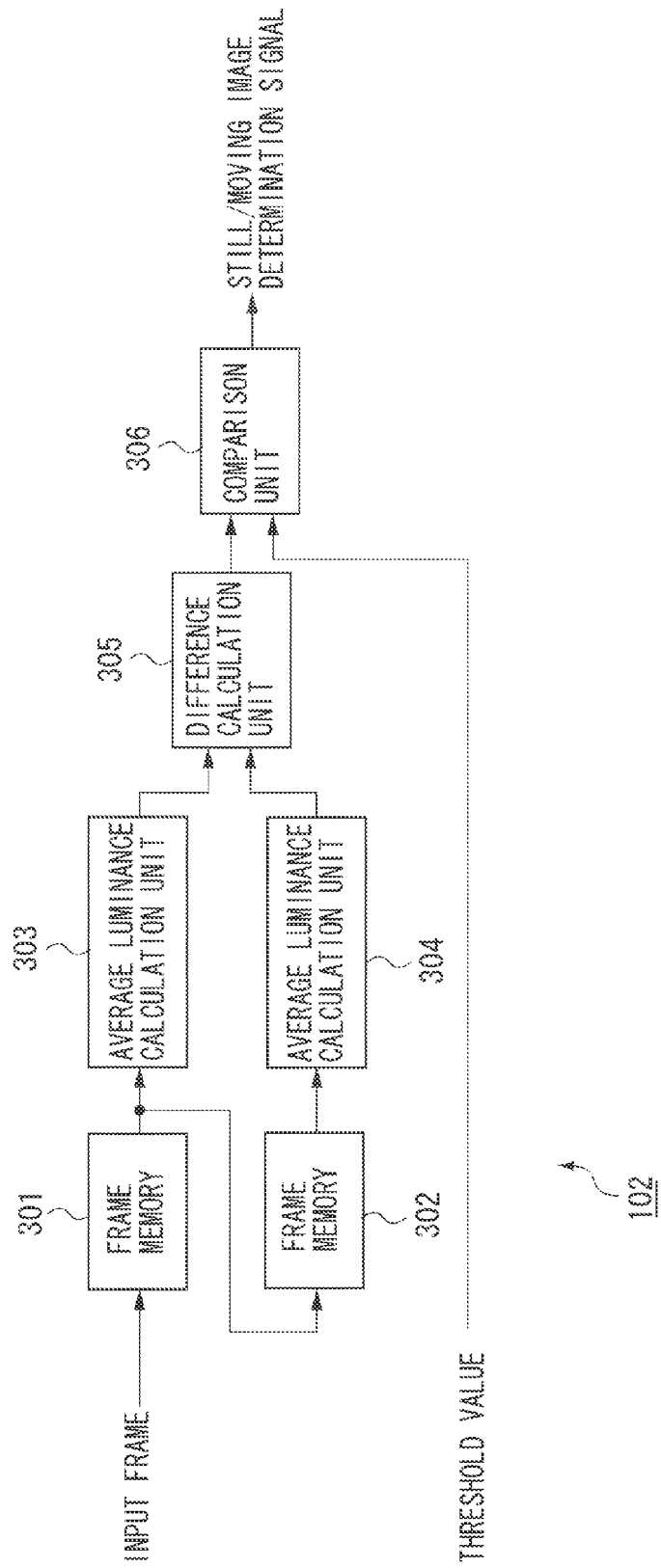
FIG. 3 illustrates a configuration example of a motion detection unit.

A motion detection unit 102 detects motion of the input frame to determine which of a still image and a moving image the input frame is. Referring to FIG. 3, the motion detection unit 102 is described. Frame memories 301 and 302 store two frames (frame n+1 and frame n) which are shifted back and forth in terms of time.

The motion detection unit 102 then reads an area of the frame n+1 located in the same position as that of a target area of the frame n from the frame memory. Average luminance calculation units 303 and 304 calculate average luminance in the areas. The motion detection unit 102 compares the luminance. An area is set for each predetermined range of vertical m dots and horizontal n dots (e.g., 8*8). Areas are advisably set within a range of vertical 1 dot*horizontal 1 dot to vertical 10 dots*horizontal 10 dots. Beyond this range, a moving image area and a still image area are highly likely to be mixed in the detection range, resulting in a disadvantageous condition.

A difference detection unit 305 calculates an absolute value of a difference in average luminance between the target areas of the frame n and the frame n+1, and determines a moving image when the absolute value is larger than a preset threshold value to output, for example, 1. When the absolute value is smaller than the threshold value, the difference detection unit 305 determines a still image to output, for example, 0. Motion is detected based on the difference in average luminance. However, the motion can be detected based on a difference in three types of image data such as R, G, and B values or Y, Cb, and Cr values. The motion is detected by referring to the two frames. However, three or more frames can be referred to. The moving image or the still image can be determined by processing such as determination of motion based on a motion vector. Thus, the determination method of the present exemplary embodiment is in no way limitative.

When an output of the motion detection unit 102 is 1 (moving image), the switching unit 107 illustrated in FIG. 1 switches between the two sub-frames, i.e., the second sub-frame and the first sub-frame, at desired timing, for example, with a frequency of 120 Hz in the case of an input 60 Hz, and outputs the frame as an output frame. When the output of the motion detection unit 102 is 0 (still image), the switching unit 107 multiplies the input frame written twice by 0.5 to output it as an output frame at desired timing. The switching unit 107 can include a buffer circuit that temporarily stores the input sub-frame and the input frame until each output timing arrives.

In many cases, color images are processed based on three types of image data such as R, G, and B values or Y, Cb, and Cr values. However, a series of processes can be performed for each of R, G, and B values, or for only a Y value. Needless to say, a Y value can be calculated from R, G, and B values, and a result can be applied to R, G, and B values.

The minimum-value filter unit 103 is used for performing the pre-processing of the low-pass filtering at the low-pass filter processing unit 104. However, the minimum-value filter unit 103 is not essential to reduce flickers of the still image. The minimum-value filter unit 103 can be appropriately employed according to purposes.

Figure 4A:
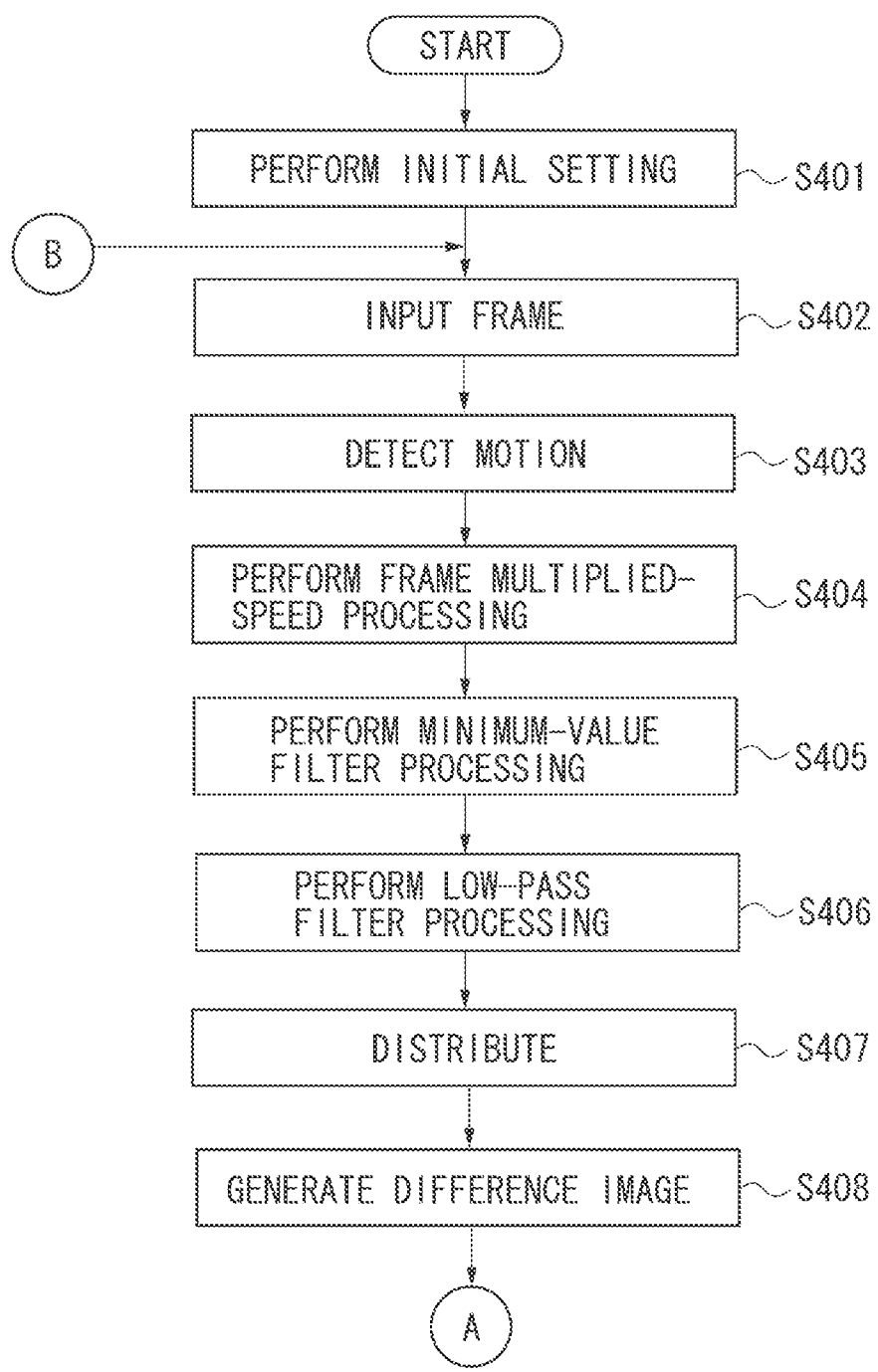
FIGS. 4A and 4B are a flowchart illustrating processing according to the first exemplary embodiment.
Figure 4B:
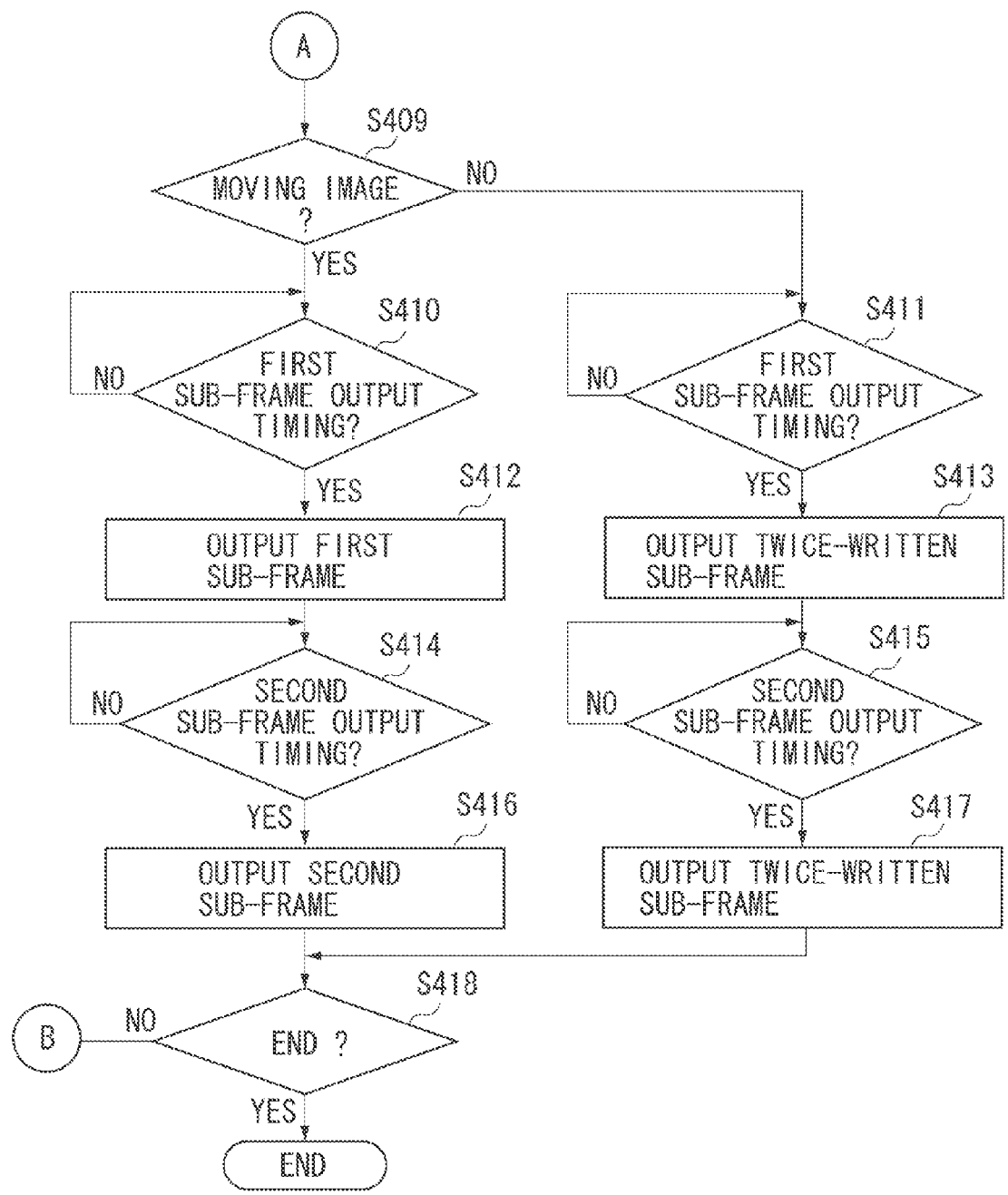

FIGS. 4A and 4B are a flowchart illustrating processing according to the present exemplary embodiment.

First, in step S401, necessary initial setting is performed. In this case, a filter size in a minimum-value filter, static characteristics of a low-pass filter, an area range in motion detection, and a threshold value are set. In step S402, an input frame is input. In the example illustrated in FIG. 2, the waveform 201 is input.

In step S403, the motion detection unit 102 detects motion from the input frame. In step S404, the input frame is converted to a multiplied speed for twice-writing. In step S405, the minimum-value filter unit 103 performs minimum-value filtering for the input frame that has been input. In the example illustrated in FIG. 2, the waveform 202 indicates a result after the minimum-value filtering, and a broken line indicates the original input waveform 201.

In step S406, the low-pass filter processing unit 104 performs low-pass filtering for the filtered input frame output from the minimum-value filter unit 103. In the example illustrated in FIG. 2, the waveform 203 is a result of performing low-pass filtering for the waveform 202.

In step S407, the distribution ratio processing unit 105 performs distribution for the input frame. The distribution processing determines a distribution ratio, i.e., what percentage of the entire frame the first sub-frame having a high-frequency component suppressed occupies. In the present exemplary embodiment, a distribution ratio is uniformly set to 50% irrespective of pixel values. In the example illustrated in FIG. 2, the waveform 203 resulting from the low-pass filtering is multiplied by 0.5 to acquire the waveform 204 reduced by half in brightness. Through this process, generation of the first sub-frame having the high-frequency component suppressed is completed.

In step S408, the difference detection unit 106 calculates a difference acquired by subtracting the generated first sub-frame from the input frame as a second sub-frame. In the example illustrated in FIG. 2, the waveform 205 is a difference waveform that becomes the second sub-frame having a high-frequency component emphasized.

In step S409, the switching unit 107 determines which of a moving image and a still image the input frame is based on a result of detecting the motion by the motion detection unit 102. If a result of the determination shows that the input frame is a moving image (YES in step S409), then in step S410, the switching unit 107 determines frame output timing. When the output timing of the first sub-frame arrives (YES in step S410), the processing proceeds to step S412. In step S412, the switching unit 107 outputs the first sub-frame. The first sub-frame can be temporarily stored in the buffer circuit of the switching unit 107, and output as an output frame from the switching unit 107 at the output timing.

After the first sub-frame has been output, in step S414, the switching unit 107 determines output timing of the second sub-frame. When the output timing arrives (YES in step S414), in step S416, the switching unit 107 outputs the second sub-frame. The second sub-frame can be temporarily stored in the buffer circuit of the switching unit 107, and output as an output frame 108 from the switching unit 107 at the output timing.

If the result of the determination shows that the input frame is a still image (NO in step S409), then in step S411, the switching unit 107 determines frame output timing. When the output timing of the first sub-frame arrives (YES in step S411), the processing proceeds to step S413. In step S413, the switching unit 107 outputs the twice-written input frame. The twice-written input frame can be temporarily stored in the buffer circuit of the switching unit 107, and output as an output frame from the switching unit 107 at the output timing.

After the first sub-frame has been output, in step S415, the switching unit 107 determines output timing of the second sub-frame. When the output timing arrives (YES in step S415), in step S417, the switching unit 107 outputs the twice-written input frame. The twice-written input frame can be temporarily stored in the buffer circuit of the switching unit 107, and output as an output frame from the switching unit 107 at the output timing.

Then, after processing has been completed for all the frames (YES in step S418), the present processing is finished. When there is an unprocessed frame (NO in step S418), the processing returns to step S402 to be repeated.

The output order of the sub-frames described above referring to the flowchart in FIGS. 4A and 4B is only an example, and thus the order is not limited to this. The first sub-frame can be output after the second sub-frame is output. Further, the output timing is determined after the creation of the two sub-frames in the above description. However, the exemplary embodiment is not limited to this. For example, the output timing of the first sub-frame can be determined at the time of low-pass filtering completion in step S406, and the difference detection can be performed after the output to generate the second sub-frame.

Thus, according to the configuration of the first exemplary embodiment, when the input frame is the moving image, the second sub-frame having the high-frequency component emphasized is displayed for a first portion of one 120th second. The first sub-frame having the high-frequency component suppressed is displayed for a next portion of one 120th second. Alternatively, the first sub-frame having the high-frequency component suppressed is displayed for the first portion of one 120th second, and the second sub-frame having the high-frequency component emphasized is displayed for the next portion of one 120th second. Thus, an apparent waveform for average time of one sixtieth second is similar to the waveform 206 illustrated in FIG. 2, becoming similar to the waveform 201 of the input frame. When the input frame is the still image, the twice-written input frame is continuously displayed while the first sub-frame and the second sub-frame are not alternately displayed. As a result, flickers can be reduced.

Figure 5:
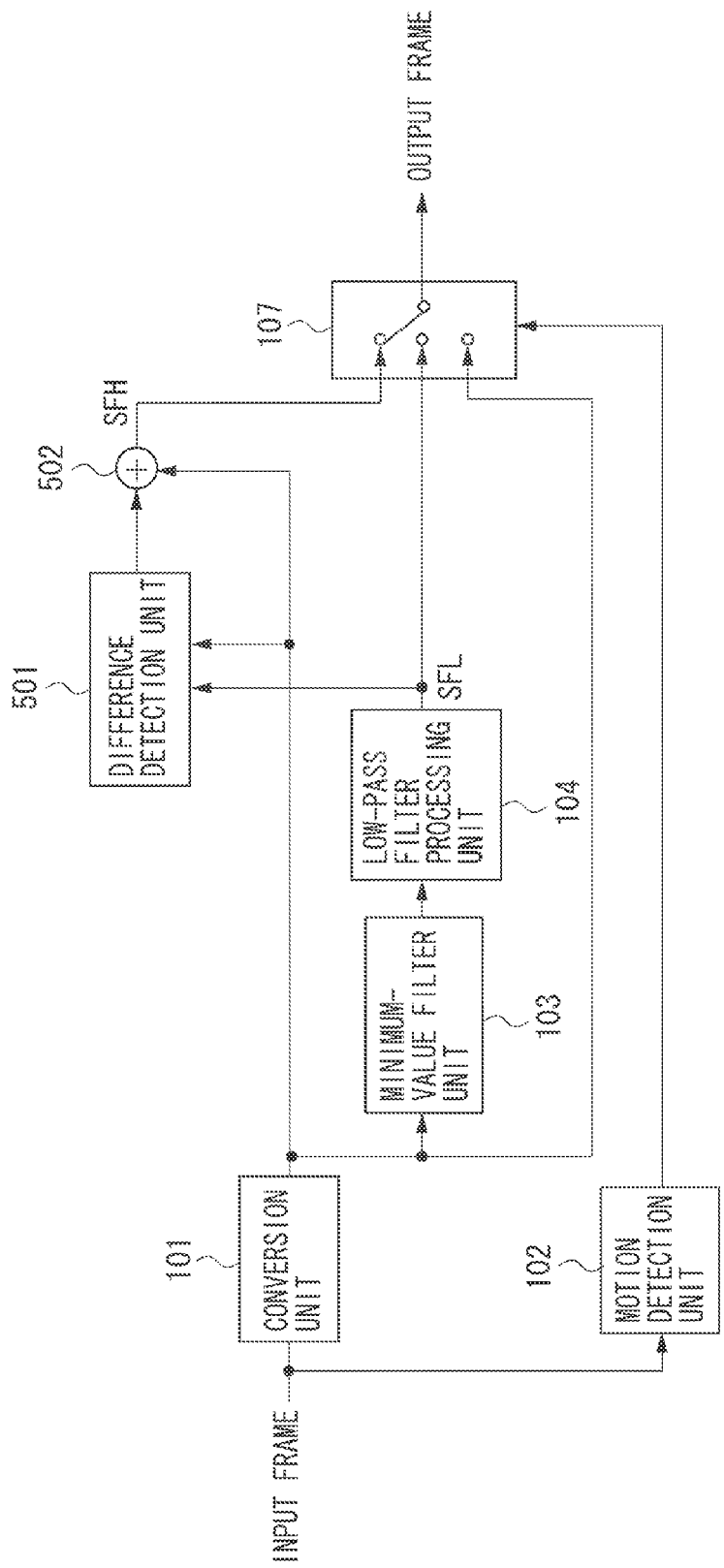
FIG. 5 illustrates an example of the image processing apparatus according to the first exemplary embodiment.
Figure 6:
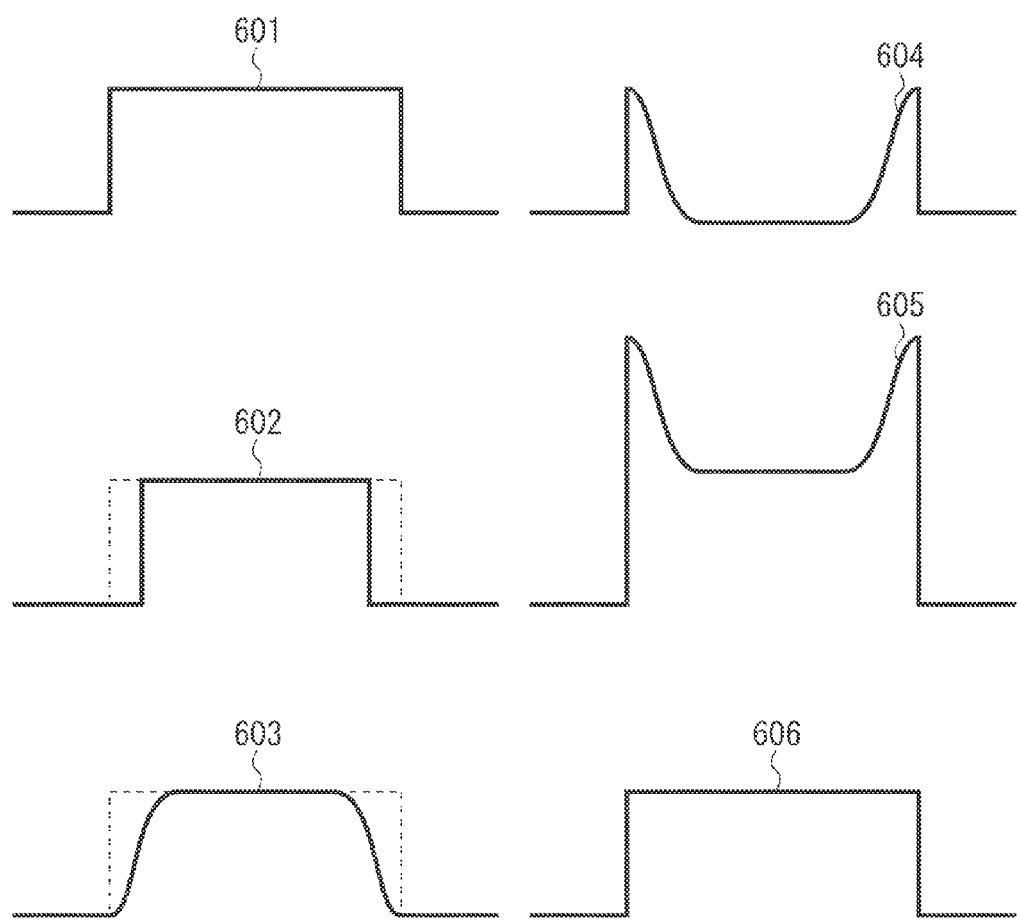
FIG. 6 illustrates a processing waveform of the image processing apparatus illustrated in FIG. 5.

For an apparatus such as a hold-type display apparatus in which flickers are difficult to be perceived, a configuration example illustrated in FIG. 5 is effective. In FIG. 5, the distribution ratio processing unit 105 is not necessary, and thus the circuit can be simplified. Instead, an addition unit 502 adds together the input frame and an output from a difference detection unit 501. This addition is executed to compensate for the high-frequency component by adding the high-frequency component suppressed in the first sub-frame to the input frame. The addition unit 502 outputs the second sub-frame having the high-frequency component emphasized. FIG. 6 illustrates a series of waveforms which are not subjected to distribution ratio processing. The waveforms 201 to 206 illustrated in FIG. 2 respectively correspond to waveforms 601 to 606 illustrated in FIG. 6, and a waveform 603 is the waveform of the first sub-frame, and a waveform 605 is the waveform of the second sub-frame.

The sub-frames can be displayed within a period shorter than one 120th second by a method for improving response characteristics of a liquid crystal or controlling a backlight. Even in such a case, the feature, i.e., an apparent waveform similar to the waveform of the input is generated at the time period of one sixtieth second, is not changed.

According to the above described configuration, even in the hold-type display apparatus, in the case of the moving image, the first sub-frame (second sub-frame) is displayed for the first portion of one 120th second, and the second sub-frame (first sub-frame) is displayed for the next portion of one 120th second. Thus, an apparent waveform for an average period of one sixtieth second is similar to the waveform 606 illustrated in FIG. 6, becoming similar to the waveform 601 of the input frame. In the case of the still image, the twice-written input frame is continuously displayed while the first sub-frame and the second sub-frame are not alternately displayed. As a result, flickers can be reduced.

The distribution ratio processing unit 105 illustrated in FIG. 1 determines a ratio of emitting light from the two sub-frames. As described above, to make flickers difficult to be seen, advisably, a difference in brightness between the two sub-frames should be little. Thus, in the first exemplary embodiment, the example of distribution of 50% each has been described. However, for a moving image including strenuous movement, a result may be better, for example, when a distribution ratio of the first sub-frame is set to 40% and a distribution ratio of the second sub-frame is set to 60% rather than the distribution ratio of 50% each.

In such a case, when the motion detection unit 102 detects a mixture of a moving image area and a still image area in one screen, in the moving image area, the first sub-frame of the distribution ratio of 40% and the second sub-frame of the distribution ratio of 60% are alternately output. Further, in the still image area, twice-written input frames of the distribution ratios of 50% are alternately output.

In this case, in one screen of 120 Hz, an image of a distribution ratio of 40% and an image of a distribution ratio of 50%, or an image of a distribution ratio of 60% and an image of a distribution ratio of 50% are mixed, so that a visible luminance difference between the moving image area and the still image area may be recognized in some cases.

A second exemplary embodiment is directed to a configuration example that provides, in addition to the effects of the first exemplary embodiment, an effect of preventing a visible luminance difference between a moving image area and a still image area even when one sub-frame contains a mixture of the moving image area and the still image area.

Figure 7:
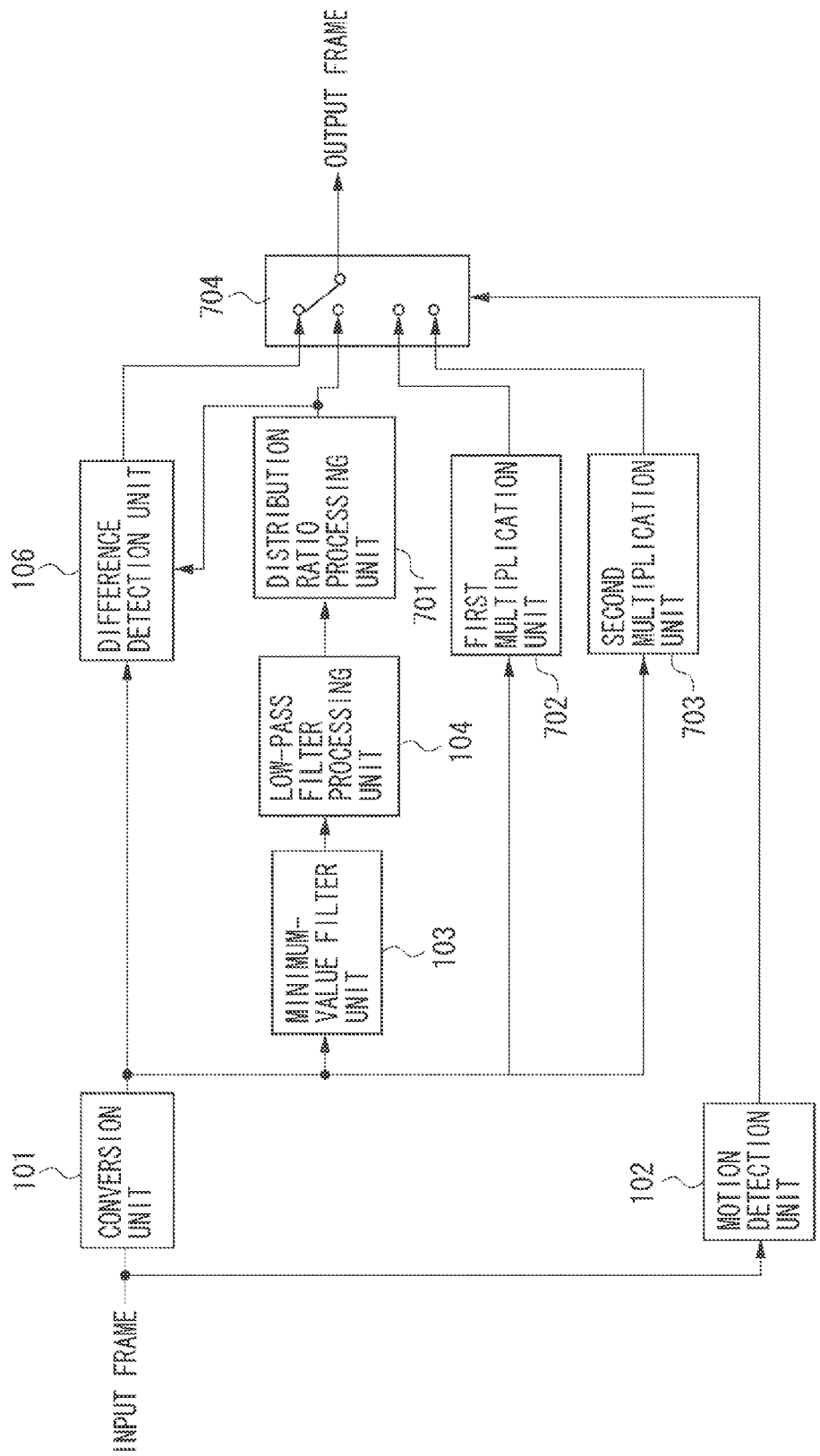
FIG. 7 illustrates an example of an image processing apparatus according to a second exemplary embodiment.

FIG. 7 illustrates an example of an image processing apparatus for performing multiplied-speed driving in a display apparatus corresponding to the present exemplary embodiment, more particularly an impulse display apparatus such as a field-emission type display apparatus. Description of processing similar to that of the first exemplary embodiment is omitted.

A distribution ratio processing unit 701 determines a ratio of emitting light from two sub-frames to execute distribution. The distribution ratio processing unit 701 outputs the determined distribution ratio to a first multiplication unit 702 and a second multiplication unit 703. The first multiplication unit 702 and the second multiplication unit 703 multiplies a twice-written input frame by distribution ratios based on the distribution ratio output from the distribution ratio processing unit 701. In this case, when the first multiplication unit 702 multiplies the input frame by the distribution ratio corresponding to the first sub-frame determined by the distribution ratio processing unit 701, the second multiplication unit 703 multiplies the input frame by the distribution ratio corresponding to the second sub-frame.

In the present exemplary embodiment, the two multiplication units are provided. However, the two multiplication units can be integrated into a single multiplication unit. In this case, a single multiplication unit can be configured to appropriately switch the distribution ratio corresponding to the first sub-frame and the distribution ratio corresponding to the second sub-frame at predetermined timing.

When an output from a motion detection unit 102 is (moving image), a switching unit 704 switches the second sub-frame output from a difference detection unit 106 and the first sub-frame output from the distribution ratio processing unit 701 to output the frames at desired timing. When the output from the motion detection unit 102 is 0 (still image), the switching unit 704 outputs multiplied input frames output from the multiplication unit 702 and the multiplication unit 703 at desired timing. The switching unit 107 can include a buffer circuit that temporarily stores an input sub-frame until each output timing arrives.

In many cases, color images are processed based on three types of image data such as R, G, and B values or Y, Cb, and Cr values. However, a series of processes can be performed for each of R, G, and B values, or for only a Y value. Needless to say, a Y value can be calculated from R, G, and B values, and a result can be applied to R, G, and B values.

As described above, the present exemplary embodiments can provide, in addition to the effects of the first exemplary embodiment, an effect of preventing a visible luminance difference between the moving image area and the still image area even when one sub-frame contains a mixture of the moving image area and the still image area.

In the above described exemplary embodiments, the units of the apparatuses illustrated in FIGS. 1, 5, and 7 are hardware components. However, the units except the frame memory can be configured by computer programs. In this case, a computer that includes a memory for storing such a computer program and a central processing unit (CPU) for executing the computer program stored in the memory can be applied to the image processing apparatus according to each of the exemplary embodiments.

Figure 8:
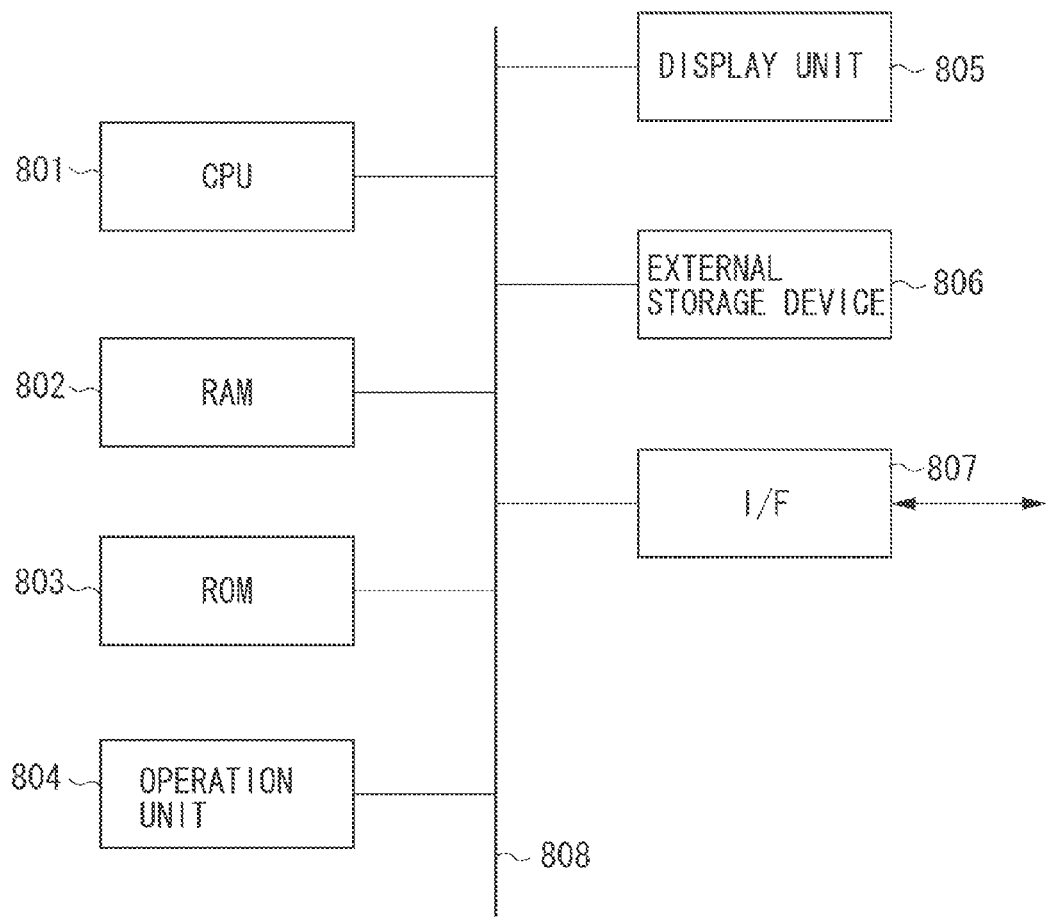
FIG. 8 illustrates an example of a hardware configuration of an image processing apparatus according to a third exemplary embodiment.

FIG. 8 is a block diagram illustrating a hardware configuration example of a computer applicable to the image processing apparatus according to each of the above exemplary embodiments.

A CPU 801 controls the entire computer using a computer program or data stored in a random access memory (RAM) 802 or a read-only memory (ROM) 803, and executes each processing described above as being executed by the image processing apparatus according to each exemplary embodiment. In other words, the CPU 801 functions as the units 101 to 107 illustrated in FIGS. 1, 5, and 7, the units 501 and 502 illustrated in FIG. 5, and the units 701 to 704 illustrated in FIG. 7.

The RAM 802 includes an area for temporarily storing the computer program or the data loaded from an external storage device 806, or data acquired from the outside via an interface (I/F) 807. The RAM 802 further includes a work area used when the CPU 801 executes various processes. In other words, the RAM 802 can, for example, can be allocated as a frame memory or appropriately provide other various areas.

The ROM 803 stores setting data of the computer or a boot program. An operation unit 804 includes a keyboard and a mouse. Operated by a user of the computer, the operation unit 804 can input various instructions to the CPU 801. A display unit 805 displays a result of processing performed by the CPU 801. The display unit 805 includes a hold-type display apparatus such as a liquid crystal display, or an impulse display apparatus such as a field-emission type display apparatus.

The external storage device 806 is a large-capacity information storage device represented by a hard disk drive. The external storage device 806 stores a computer program to realize an operating system (OS), a function of each of the units illustrated in FIGS. 1, 5, and 7, or the flow of processing illustrated in FIG. 2 by the CPU 801. Further, the external storage device 806 can store each image data as a processing target.

The computer program or the data stored in the external storage device 806 is appropriately loaded to the RAM 802 under control of the CPU 801 to become a processing target of the CPU 801. A network such as local area network (LAN) or Internet, and other devices can be connected to the I/F 807. The computer can acquire or transmit various types of information via the I/F 807. A bus 808 interconnects the units.

For an operation in the configuration, the operation described above referring to the flowchart is performed mainly by the CPU 801.

The embodiments can be applied to a system including a plurality of devices (e.g., a host computer, an interface device, a reader, and a printer), or an apparatus (e.g., a copying machine or a facsimile) including one device.

The embodiments can be achieved by supplying a storage medium recording codes of the computer program to realize the above described functions to a system, and reading and executing the codes of the computer program by the system. In this case, the codes of the computer program read from the storage medium realize the functions of the exemplary embodiments themselves, and the storage medium storing the codes of the computer program constitutes the present invention. Based on instructions of the codes of the computer program, the OS operated on the computer executes a part or all of actual processing to realize the functions. This case is also within the present invention.

The embodiments can be realized by the following form. More specifically, codes of a computer program read from a storage medium are written in a memory included in a function extension card inserted into the computer or a function extension unit connected to the computer. Based on instructions of the codes of the computer program, a CPU included in the function extension card or the function extension unit executes a part or all of actual processing to realize the functions. This case is within the present invention. In an example, a computer-readable medium may store a program that causes an image processing apparatus to perform a method described herein. In another example, a central processing unit (CPU) may be configured to control at least one unit utilized in a method or apparatus described herein.

When the present invention is applied to the storage medium, the storage medium stores the codes of the computer program corresponding to the processing illustrated in flowcharts.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-282295 filed Dec. 11, 2009, which is hereby incorporated by reference herein in its entirety.

What is claimed is:

1. An image processing apparatus to reduce flickers and blurs in moving image data and still image data, the image processing apparatus comprising:
a conversion unit configured to store an input frame in a frame memory and read the input frame a plurality of times to convert the input frame into a twice-written input frame having a converted frame rate;
a generation unit configured to receive the input frame from the conversion unit generate frames different from each other in frequency component;
a detection unit configured to determine whether the input frame is a moving image or a still image by comparing the input frame with a frame immediately before or after the input frame in terms of time;
a switching unit configured to multiple the twice-written input frame by a twice-written distribution ratio to generate a multiplied twice-written input frame, and output frames at predetermined timings,
wherein, in response to the detection unit determining that the input frame is a still image, the switching unit refrains from outputting the frames different from each other in frequency component and outputs the multiplied twice-written input frame at each predetermined timing and, in response to the detection unit determining that the input frame is a moving image, the switching unit refrains from outputting the multiplied twice-written input frame and outputs a frame different from other frames in frequency component at each predetermined timing; and
a central processing unit, wherein the central processing unit implements at least one of the conversion unit, the generation unit, the detection unit, and the switching unit.

2. The image processing apparatus according to claim 1, wherein the detection unit compares pixels of at least two frames corresponding to a processing target pixel of the input frame and shifted back and forth in terms of time, determines that the input frame is a moving image if a difference between the pixels is larger than a preset threshold value, and determines that the input frame is a still image if the difference is smaller than the preset threshold value.

3. The image processing apparatus according to claim 2, wherein the detection unit compares average luminance of the pixels of the at least two frames corresponding to the processing target pixel of the input frame and shifted back and forth in terms of time.

4. The image processing apparatus according to claim 1, wherein the generation unit includes:
a low-pass filter processing unit configured to generate a first sub-frame by performing low-pass filtering on the input frame, and
a sub-frame generation unit configured to generate a second sub-frame from the first sub-frame and the input frame, wherein
the switching unit alternates output of the first sub-frame and the second sub-frame at the predetermined timings if the detection unit determines that the input frame is a moving image.

5. The image processing apparatus according to claim 4, wherein the generation unit further includes:
a minimum-value filter unit configured to replace a pixel value of each pixel included in the input frame with a minimum pixel value among pixel values of peripheral pixels of the pixel, wherein
the low-pass filter processing unit performs the low-pass filtering for the input frame processed by the minimum-value filter unit.

6. The image processing apparatus according to claim 4, wherein the generation unit further includes:
a distribution ratio processing unit configured to generate the first sub-frame by multiplying the frame subjected to the low-pass filtering by the low-pass filter processing unit by a predetermined distribution ratio, wherein
the sub-frame generation unit generates the second sub-frame from the first sub-frame generated by multiplying the frame by the predetermined distribution ratio via the distribution ratio processing unit and the input frame.

7. The image processing apparatus according to claim 6, further comprising:
a multiplication unit configured to multiply the input frame by the predetermined distribution ratio,
wherein, in response to the detection unit determining that the input frame is a still image, the switching unit outputs the input frame multiplied by the predetermined distribution ratio by the multiplication unit.

8. A method for controlling an image processing apparatus to reduce flickers and blurs in moving image data and still image data, the method comprising:

storing an input frame in a frame memory and reading the input frame a plurality of times to convert the input frame into a twice-written input frame having a converted frame rate;

receiving the input frame and generating frames different from each other in frequency component;

determining whether the input frame is a moving image or a still image by comparing the input frame with a frame immediately before or after the input frame in terms of time;

multiplying the twice-written input frame by a twice-written distribution ratio to generate a multiplied twice-written input frame, and outputting frames at predetermined timings, wherein, in response to determining that the input frame is a still image, outputting frames includes refraining from outputting the frames different from each other in frequency component and includes outputting the multiplied twice-written input frame at each predetermined timing and, in response to determining that the input frame is a moving image, outputting frames includes refraining from outputting the multiplied twice-written input frame and includes outputting a frame different from other frames in frequency component at each predetermined timing.

9. A non-transitory computer-readable medium storing a program that causes a computer to perform the method according to claim 8.

10. The image processing apparatus according to claim 1, wherein the frames different from each other in frequency component are multiplied by a generation unit distribution ratio that is independent of the twice-written distribution ratio used to generated the multiplied twice-written input frame.

11. The image processing apparatus according to claim 1, wherein the frames different from each other in frequency component are multiplied by a generation unit distribution ratio, wherein the twice-written distribution ratio used to generated the multiplied twice-written input frame is based on the generation unit distribution ratio.

\* \* \* \* \*